United States Patent
Wang et al.

(10) Patent No.: US 9,261,920 B2
(45) Date of Patent: Feb. 16, 2016

(54) METHOD FOR CONTROLLING WEARABLE DEVICE

(71) Applicant: Quanta Computer Inc., Kuei Shan Hsiang, Tao Yuan Shien (TW)

(72) Inventors: Yang-Sheng Wang, Tao Yuan Shien (TW); Yu-Ching Chen, Tao Yuan Shien (TW); Yung-Chi Hsu, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 138 days.

(21) Appl. No.: 14/215,531

(22) Filed: Mar. 17, 2014

(65) Prior Publication Data

US 2015/0161885 A1 Jun. 11, 2015

(30) Foreign Application Priority Data

Dec. 6, 2013 (TW) ............... 102144770 A

(51) Int. Cl.
*G06F 1/16* (2006.01)
(52) U.S. Cl.
CPC .............. *G06F 1/1694* (2013.01); *G06F 1/163* (2013.01)
(58) Field of Classification Search
CPC ............... A61B 5/681; A61B 5/02438; A61B 2562/0219; G06F 1/163; G06F 3/017
See application file for complete search history.

(56) References Cited

U.S. PATENT DOCUMENTS

| 8,896,526 B1* | 11/2014 | Park | G04C 3/002 345/156 |
| 2011/0205851 A1* | 8/2011 | Harris | G04G 9/0064 368/14 |
| 2015/0022438 A1* | 1/2015 | Hong | H04M 1/7253 345/156 |

FOREIGN PATENT DOCUMENTS

| CN | 102799268 | 11/2012 |
| CN | 103006234 | 4/2013 |

OTHER PUBLICATIONS

Taiwanese language office action dated Jun. 29, 2015, issued in application No. TW 102144770.

* cited by examiner

*Primary Examiner* — James Yang
(74) *Attorney, Agent, or Firm* — McClure, Qualey & Rodack, LLP

(57) ABSTRACT

A method for controlling a wearable device includes the steps of: providing the wearable device which includes a sensor; detecting and recording movement data relative to the wearable device via the sensor; determining whether the wearable device has triggered a start condition; if the start condition has been triggered, analyzing the movement data; determining whether a user has finished putting on the wearable device according to the analyzed movement data; and if the user has finished putting on the wearable device, determining whether the wearable device is worn on a left side or a right side of the user according to the analyzed movement data.

7 Claims, 9 Drawing Sheets

METHOD FOR CONTROLLING WEARABLE DEVICE

CROSS REFERENCE TO RELATED APPLICATIONS

This Application claims priority of Taiwan Patent Application No. 102144770 filed on Dec. 6, 2013, the entirety of which is incorporated by reference herein.

BACKGROUND OF THE INVENTION

1. Field of the Invention

The disclosure generally relates to a control method, and more particularly, to a control method for automatically detecting the left and right sides of a wearable device.

2. Description of the Related Art

In recent years, wearable devices have developed very fast. However, some specific types of wearable devices are limited by the direction of use. For example, if a left-handed watch is worn on a right-handed user, a problem of reversed-contents will occur. As a result, the user should pay more attention to the correct direction of a wearable device before putting on it. This is not convenient for the user.

BRIEF SUMMARY OF THE INVENTION

To overcome the drawbacks of the prior art, in a preferred embodiment, the disclosure is directed to a control method, including the steps of: providing a wearable device which includes a sensor; detecting and recording movement data relative to the wearable device via the sensor; determining whether the wearable device has triggered a start condition; if the start condition has been triggered, analyzing the movement data; determining whether a user has finished putting on the wearable device according to the analyzed movement data; and if the user has finished putting on the wearable device, determining whether the wearable device is worn on a left side or a right side of the user according to the analyzed movement data.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1:
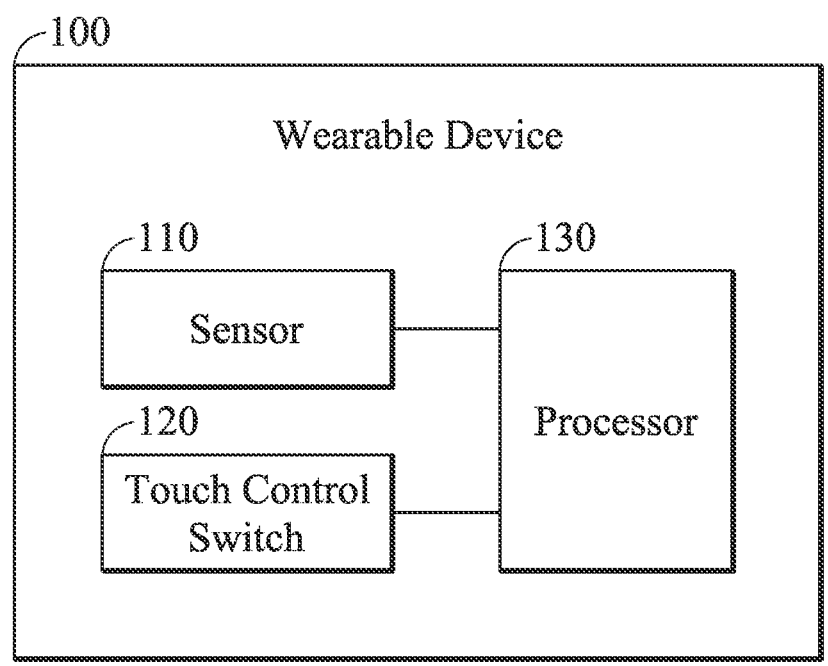
FIG. 1 is a diagram for illustrating a wearable device according to an embodiment of the invention.

FIG. 1 is a diagram for illustrating a wearable device 100 according to an embodiment of the invention. For example, the wearable device 100 may be a smart watch, a sports bracelet, a sphygmomanometer, or other physiological signal receiving devices. As shown in FIG. 1, the wearable device 100 may include a sensor 110, a control switch 120, and/or a processor 130. The sensor 110 is configured to detect and record a movement data relative to the wearable device 100. In some embodiments, the sensor 110 is a gravity sensor (G-sensor) or a gyro. The control switch 120 is configured to determine whether the wearable device 100 has triggered a start condition. In some embodiments, the control switch 120 is touch control switch, a sensing metal piece, a button, a distance detector, or a sensing buckle implemented in electronic or mechanical ways. The processor 130 is coupled to the sensor 110 and the touch control switch 120. The processor 130 is configured to execute determining and analyzing processes in the invention, and it may be implemented with a physical circuit or implemented with software program codes stored in computer-readable media. It is understood that the wearable device 100 may further include other components, such as a wire/wireless communication module, a battery, an display device, a surface glass, a connection belt, and a housing (not shown).

Figure 2:
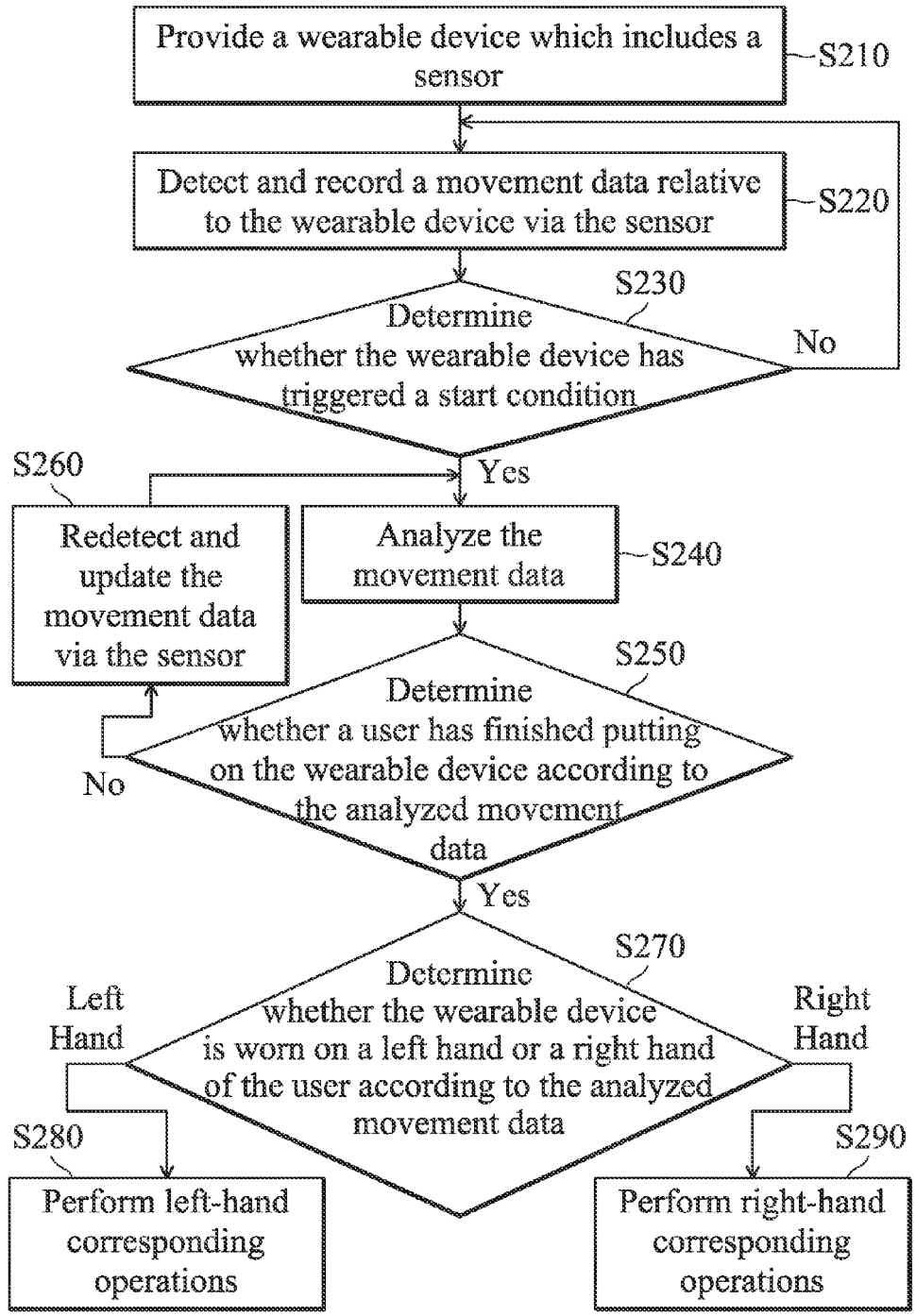
FIG. 2 is a flowchart for illustrating a control method for controlling a wearable device according to an embodiment of the invention.

FIG. 2 is a flowchart for illustrating a control method for controlling a wearable device according to an embodiment of the invention. To begin, in step S210, a wearable device is provided, and the wearable device includes a sensor. The internal components of the wearable device may be described in the embodiment of FIG. 1. In step S220, a movement data relative to the wearable device is detected and recorded via the sensor. For example, when the wearable device is rotated by a user, a relative difference between the amounts of rotation may be detected and recorded via the sensor. In step S230, whether the wearable device has triggered a start condition is determined. The triggered start condition may mean that the user has started to put on the wearable device. In some embodiments, if the user has touched the control switch 120 (e.g., a sensing metal piece) of the wearable device, it can be determined that the start condition has been triggered, and if the control switch 120 has not been touched, it can be determined that the start condition has not been triggered. In other embodiments, adjustments are made such that the control switch 120 is implemented with a strap buckle. If the strap buckle is fastened, it can be determined that the start condition has been triggered, and if the strap buckle is not fastened, it can be determined that the start condition has not been triggered.

Next, if the start condition has not been triggered, the procedure may go back to step S220, more movement data relative to the wearable device may be continuously detected and recorded. If the start condition has been triggered, in step S240, the movement data can be analyzed. In some embodiments, if the start condition has been triggered, the sensor may stop detecting and recording the movement data temporarily. In step S250, whether the user has finished putting on the wearable device is determined according to the analyzed movement data. If the user has not finished putting on the wearable device, in step S260, the movement data can be redetected and continuously updated via the sensor for further analysis (e.g., the procedure may go back to steps S240 and S250 again). If the user has finished putting on the wearable device, in step S270, whether the wearable device is worn on the left hand or the right hand of the user can be determined according to the analyzed movement data. If the wearable device is worn on the left hand of the user, in step S280, some left-handed corresponding operations may be performed. If the wearable device is worn on the right hand of the user, in step S290, some right-handed corresponding operations may be performed. For example, if the wearable device is a left-handed watch, the left-handed corresponding operations may include displaying watch contents normally, and the right-handed corresponding operations may include displaying the watch contents reversely. For example, if the wearable device is a sphygmomanometer, the left-handed corresponding operations may include recording a left-hand blood pressure data, and the right-handed corresponding operations may include recording a right-hand blood pressure data.

Figure 3:
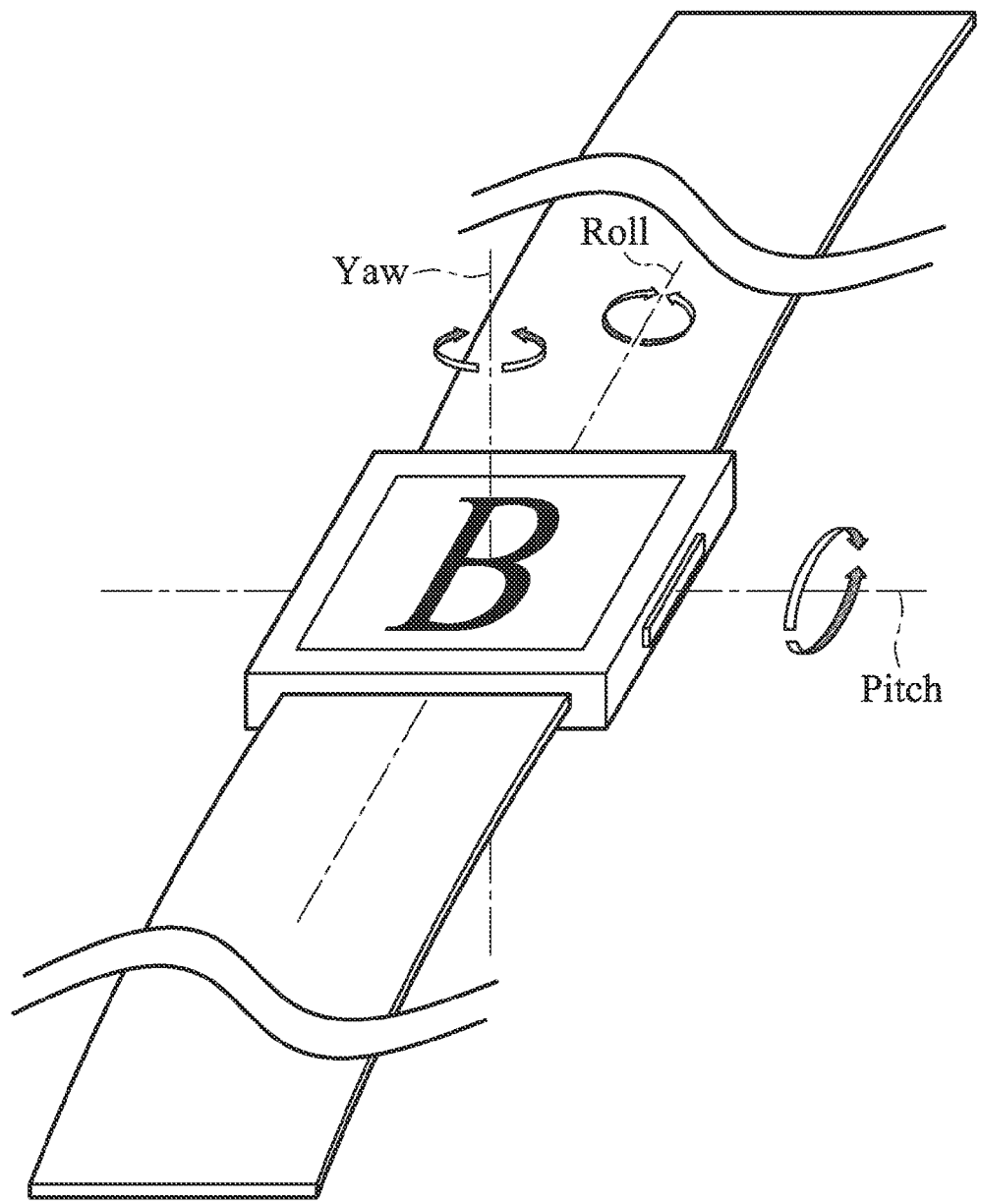
FIG. 3 is a diagram for illustrating a wearable device according to an embodiment of the invention.

FIG. 3 is a diagram for illustrating a wearable device 300 according to an embodiment of the invention. In the embodiment of FIG. 3, the wearable device 300 is a smart watch, and a sensor of the wearable device 300 is a gravity sensor or a gyro. As shown in FIG. 3, the wearable device 300 may be rotated along three axes, which may include a first axis Yaw, a second axis Roll, and a third axis Pitch. The three axes may be perpendicular to each other. More particularly, the first axis Yaw is perpendicular to a watch surface (front surface) of the wearable device 300, and the second axis Roll is parallel to a watch band of the wearable device 300. The aforementioned axes may be defined according to the orientation of the sensor disposed in the wearable device 300. The movement data relative to the wearable device 300 may include any one or more rotation angles of the wearable device 300 along any one or more of the three axes, and the one or more rotation angles may be detected and recorded by the gravity sensor or the gyro. Please refer to the detailed descriptions in the following embodiments of FIG. 4A and FIG. 4B.

Figure 4A:
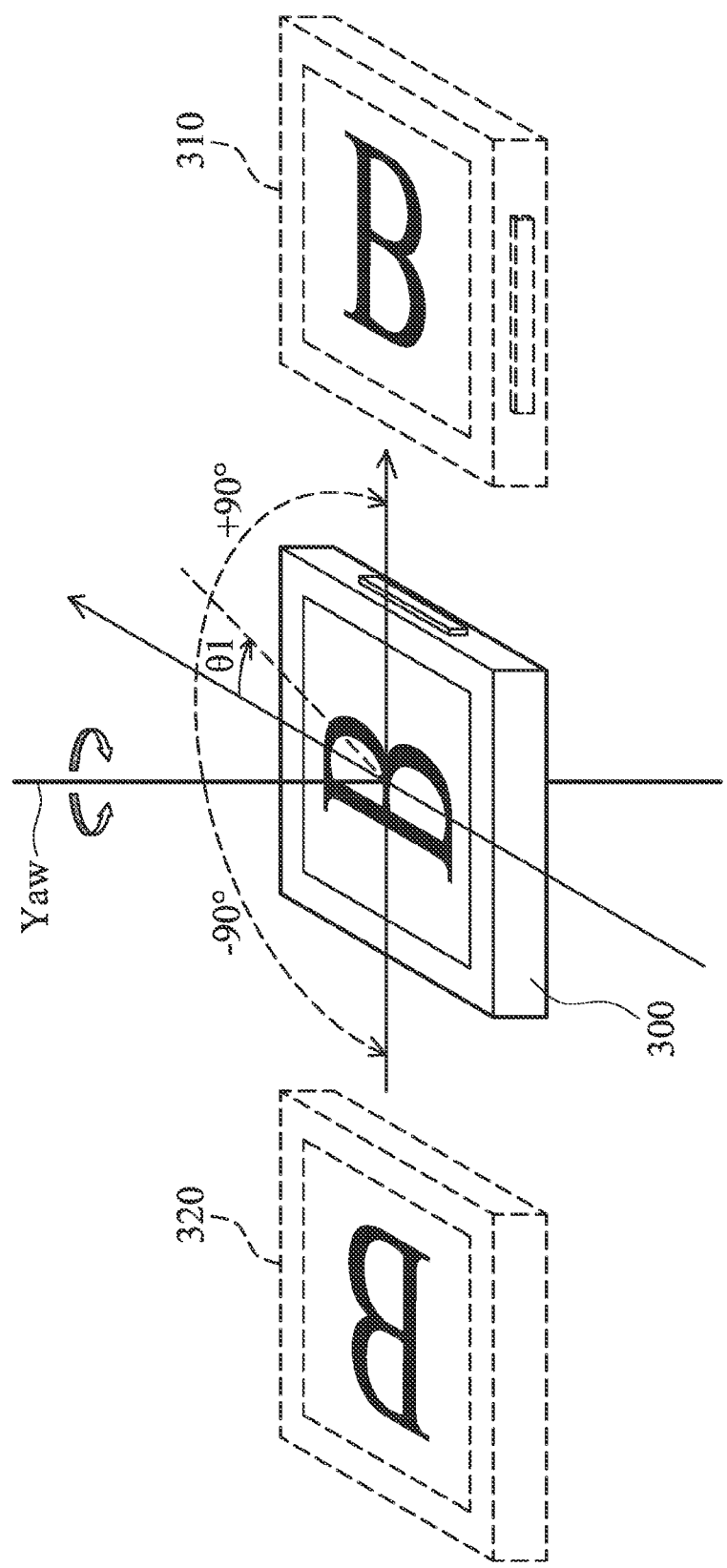
FIG. 4A is a diagram for illustrating a wearable device rotated along a first axis according to an embodiment of the invention.

FIG. 4A is a diagram for illustrating the wearable device 300 rotated along the first axis Yaw according to an embodiment of the invention. When the wearable device 300 is originally placed, it may be defined that a first rotation angle $\theta 1$ of the wearable device 300 along the first axis Yaw is equal to 0 degrees. Every time the wearable device 300 is rotated along the first axis Yaw by a user, the gravity sensor or the gyro of the wearable device 300 can compute a first relative difference between the amounts of rotation (e.g., a first angular velocity) and find the updated first rotation angle $\theta 1$ accordingly. For example, when the updated first rotation angle $\theta 1$ is equal to +90 degrees, it may mean that the wearable device 300 has been rotated by 90 degrees from left to right along the first axis Yaw as shown as a dashed-line component 310. For example, when the updated first rotation angle $\theta 1$ is equal to −90 degrees, it may mean that the wearable device 300 has been rotated by 90 degrees from right to left along the first axis Yaw as shown as another dashed-line component 320. The relationship between other first rotation angle $\theta 1$ and other rotation state of the wearable device 300 may be determined in similar ways to the above.

Figure 4B:
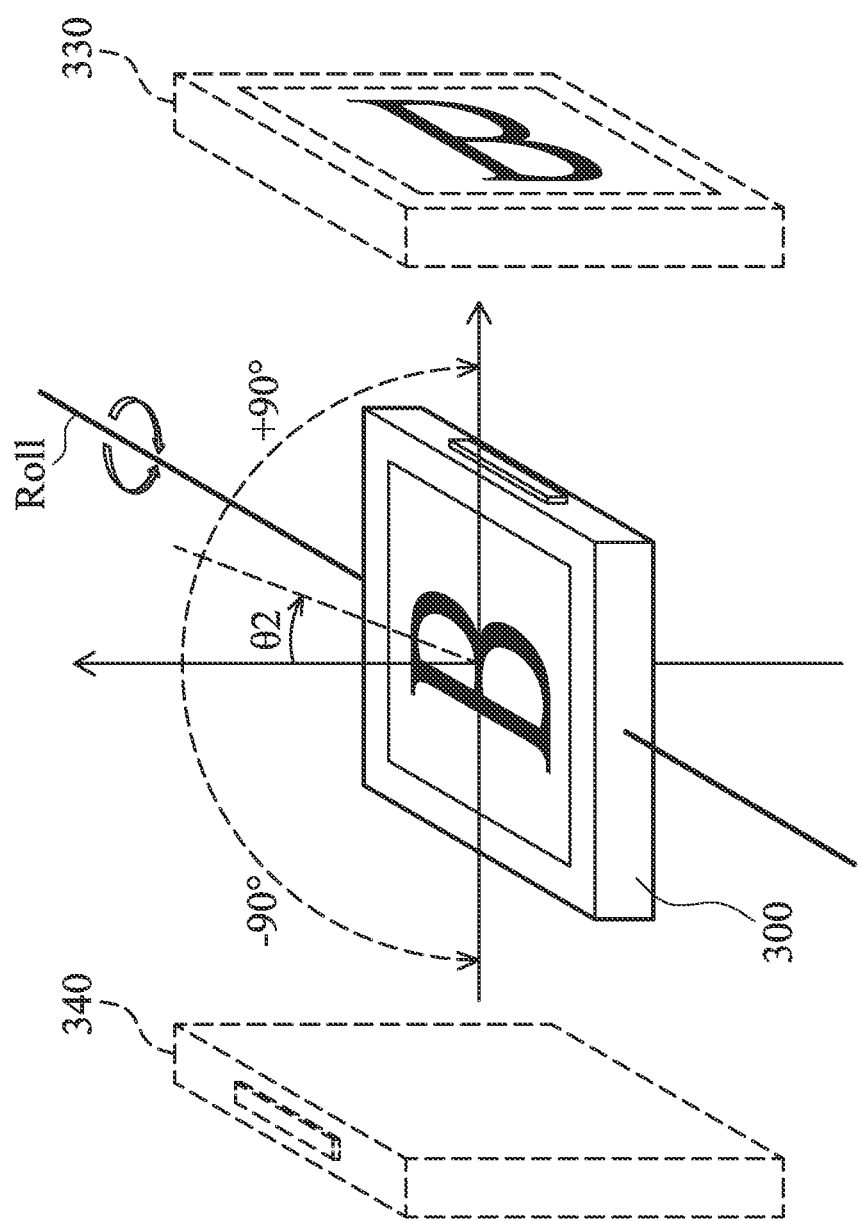
FIG. 4B is a diagram for illustrating a wearable device rotated along a second axis according to an embodiment of the invention.

FIG. 4B is a diagram for illustrating the wearable device 300 rotated along the second axis Roll according to an embodiment of the invention. When the wearable device 300 is originally placed, it may be defined that a second rotation angle $\theta 2$ of the wearable device 300 along the second axis Roll is equal to 0 degrees. Every time the wearable device 300 is rotated along the second axis Roll by a user, the gravity sensor or the gyro of the wearable device 300 can compute a second relative difference between the amounts of rotation (e.g., a second angular velocity) and find the updated second rotation angle $\theta 2$ accordingly. For example, when the updated second rotation angle $\theta 2$ is equal to +90 degrees, it may mean that the wearable device 300 has been rotated by 90 degrees from left to right along the second axis Roll as shown as a dashed-line component 330. For example, when the updated second rotation angle $\theta 2$ is equal to −90 degrees, it may mean that the wearable device 300 has been rotated by 90 degrees from right to left along the second axis Roll as shown as another dashed-line component 340. The relationship between other second rotation angle $\theta 2$ and other rotation state of the wearable device 300 may be determined in similar ways to the above.

Figure 5:
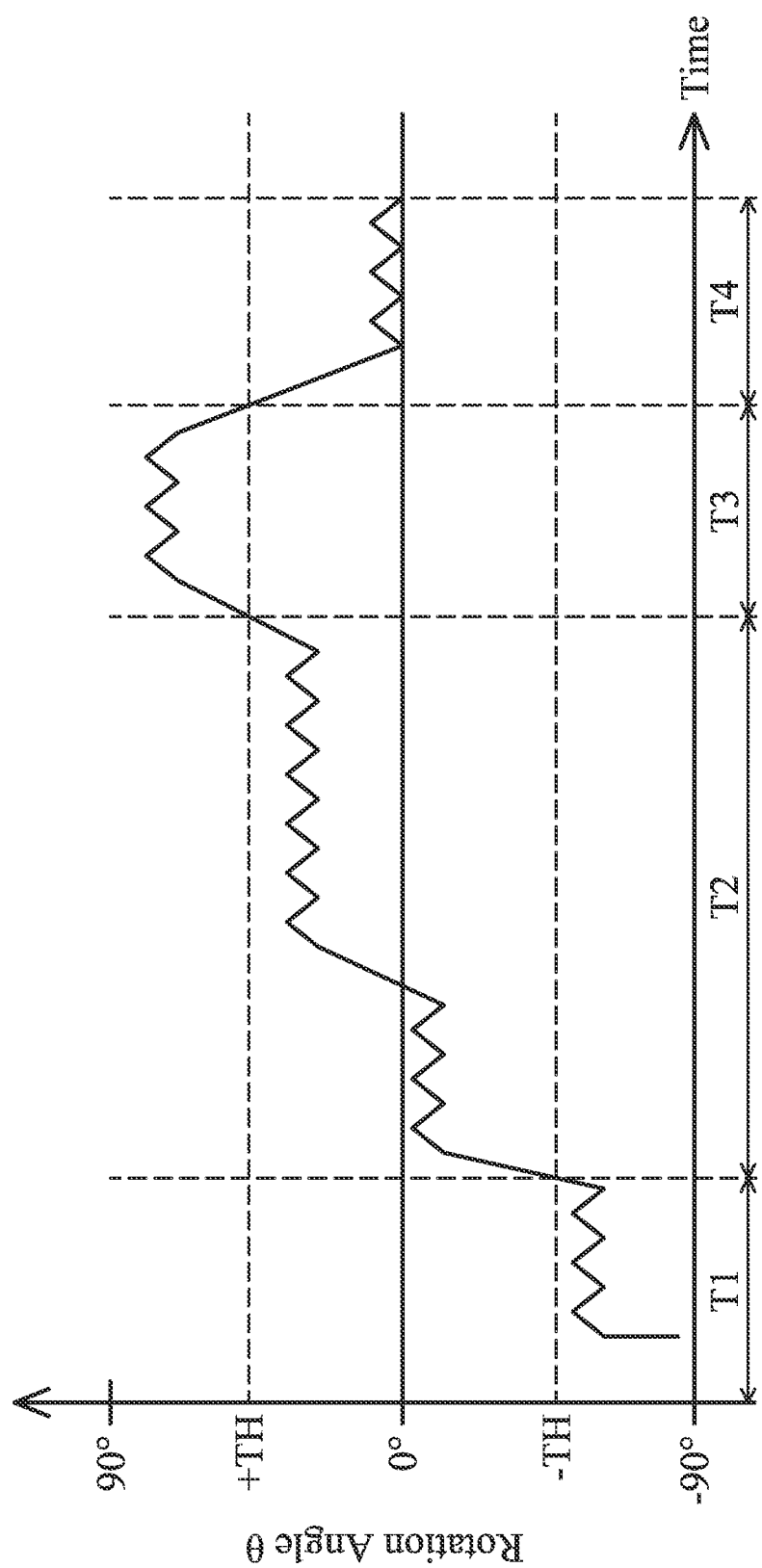
FIG. 5 is a timing diagram for illustrating a rotation angle of a wearable device according to an embodiment of the invention.

FIG. 5 is a timing diagram for illustrating a rotation angle $\theta$ of the wearable device 300 according to an embodiment of the invention. This rotation angle $\theta$ may represent the first rotation angle $\theta 1$ of the wearable device 300 along the first axis Yaw, or the second rotation angle $\theta 2$ of the wearable device 300 along the second axis Roll. As described above, the rotation angle $\theta$ may be detected and recorded by the gravity sensor or the gyro of the wearable device 300, and the rotation angle $\theta$ may represent a variety of rotation states of the wearable device 300. In the embodiment of FIG. 5, a first range, a second range, and a third range of the rotation angle $\theta$ may be defined by using a first threshold value −TH and a second threshold value +TH. For example, the first threshold value −TH and the second threshold value +TH may be −45 degrees and +45 degrees, respectively. For another example, the first threshold value −TH and the second threshold value +TH may be −30 degrees and +30 degrees, respectively. If the rotation angle $\theta$ is between the first threshold value −TH and the second threshold value +TH, it can be defined as the rotation angle $\theta$ being within the first range. In some embodiments, the first range represents the user not having finished putting on the wearable device 300. In this case, whether the wearable device 300 is worn on the left hand or the right hand of the user cannot be determined, and there is a need to continuously collect more movement data to complete the determination. The first range is defined to avoid an accidental movement or swaying of the user causing execution of step S270 and the left-handed or right-handed corresponding operations of the wearable device 300. The conception is that if the user moves or sways the wearable device 300 unintentionally, the generated rotation angle $\theta$ should be relatively small. Therefore, if the rotation angle $\theta$ is within the first range, it can be determined that the user does not intentionally perform a putting-on operation.

If the rotation angle $\theta$ is between −90 degrees and the first threshold value −TH, it can be defined as the rotation angle $\theta$ being within the second range. If the rotation angle $\theta$ is between the second threshold value +TH and +90 degrees, it can be defined as the rotation angle $\theta$ being within the third range. In some embodiments, the second range and the third range both represent the user having finished putting on the wearable device 300. In the embodiment of FIG. 5, the rotation angle $\theta$ is within the second range during a first time interval T1; the rotation angle $\theta$ is within the first range during a second time interval T2 and a fourth time interval T4; and the rotation angle $\theta$ is within the third range during a third time interval T3. Note that the first range, the second range, and the third range do not overlap with each other. The second range and the third range are defined to check whether a user performs a putting-on operation. If so, the procedure may proceed to step S270 to perform left-handed or right-handed corresponding operations. The conception is that if the user performs the putting-on operation, the generated rotation angle θ should be larger than a predetermined range. Therefore, if the rotation angle θ is larger than the first range, such as entering the second range or the third range, it can be determined that the user actually performs the putting-on operation. In some embodiments, it can be determined that the user performs the putting-on operation only if the rotation angle θ is kept within the second range or the third range continuously for a predetermined period of time, such as one or two seconds. This design can avoid an unintentional movement or swaying of the user causing the rotation angle θ of the wearable device 300 to enter the second range or the third range. The conception is that if the user unintentionally moves or sways the wearable device 300, the continuous time thereof may be relatively short. In such a manner, the accuracy of determination may be increased.

In some embodiments, wearable devices may be further divided into a first type with directionality and a second type without directionality. For example, the first type of wearable devices may include a watch and headphones, and the second type of wearable devices may include a sports bracelet and a sphygmomanometer. The first type of wearable devices may determine left-hand or right-hand sides according to single rotation angle. The second type of wearable devices may determine left-hand or right-hand sides according to at least two rotation angles. That is, the first type of wearable devices may be considered as a simplified case of the second type of wearable devices. Please refer to the detailed descriptions in the following embodiments of FIG. 6, FIG. 7A, and FIG. 7B. In some embodiments, whether a wearable device is directional is determined when it is manufactured in a factory. For example, if a wearable device is a watch manufactured with different symbols or numbers "1" to "12" disposed on the watch surface, this type of wearable device may be directional. Conversely, if a wearable device is a watch manufactured with the same twelve symbols or numbers disposed on the watch surface, this type of wearable device may not be directional since the wearable device displays the same watch contents, regardless of on which hand of the user puts on the wearable device.

Figure 6:
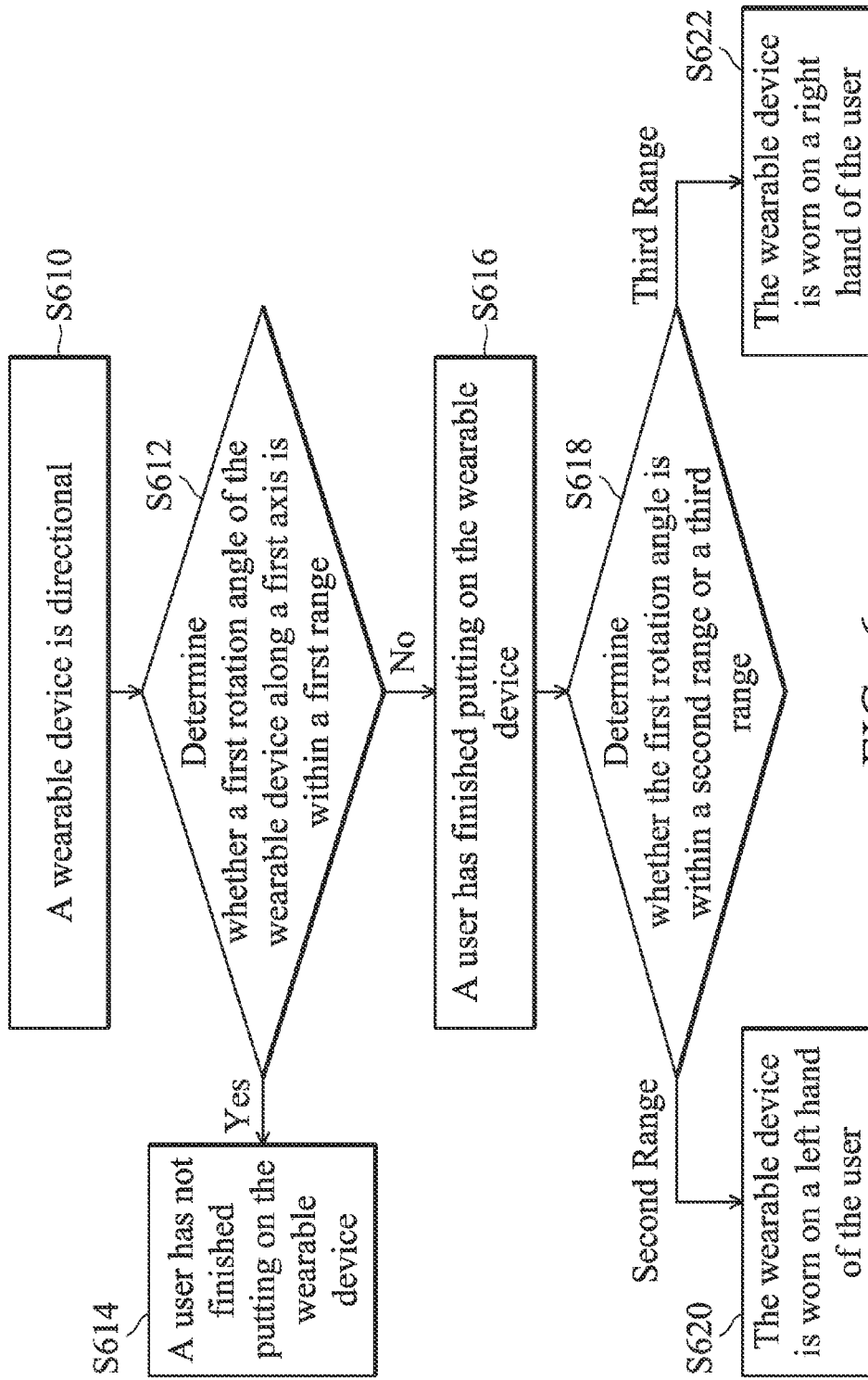
FIG. 6 is a flowchart for illustrating a control method for controlling a wearable device with directionality according to an embodiment of the invention.

FIG. 6 is a flowchart for illustrating a control method for controlling a wearable device with directionality according to an embodiment of the invention. FIG. 6 is used to describe detailed operations of steps S250 and S270 of FIG. 2. Following the descriptions of FIG. 2, the movement data is analyzed in step S240. In the embodiment of FIG. 6, the analyzed movement data includes a first rotation angle of the wearable device along a first axis. Please refer to FIG. 6. In step S610, it is determined that the wearable device is directional. In step S612, whether the first rotation angle is within a first range is determined. If the first rotation angle is within the first range, in step S614, it can be determined that the user has not finished putting on the wearable device (the procedure may go to step S260 of FIG. 2). If the first rotation angle is not within the first range, in step S616, it can be determined that the user has finished putting on the wearable device. Next, in step S618, whether the first rotation angle is within a second range or a third range is determined. If the first rotation angle is within the second range, in step S620, it can be determined that the wearable device is worn on the left hand of the user (the procedure may go to step S280 of FIG. 2). If the first rotation angle is within the third range, in step S622, it can be determined that the wearable device is worn on the right hand of the user (the procedure may go to step S290 of FIG. 2).

TABLE I

Determination of Left and Right for Wearable Device with Directionality

| $-90° < θ1 < -TH$ | $+TH < θ1 < +90°$ |
|---|---|
| Left Hand | Right Hand |

To be brief, in the embodiment of FIG. 6, the determination conditions of the wearable device with directionality may be illustrated in Table I, in which "θ1" represents a first rotation angle, "-TH" represents a first threshold value, and "+TH" represents a second threshold value. The aforementioned axes, threshold values, rotation angles, and angle ranges may be described in the embodiments of FIG. 3, FIG. 4A, and FIG. 5. The determination conditions of Table I are set according to the habits of human beings putting on wearable devices. A wearable device with directionality may require just a single rotation angle to complete the determination procedure.

Figure 7A:
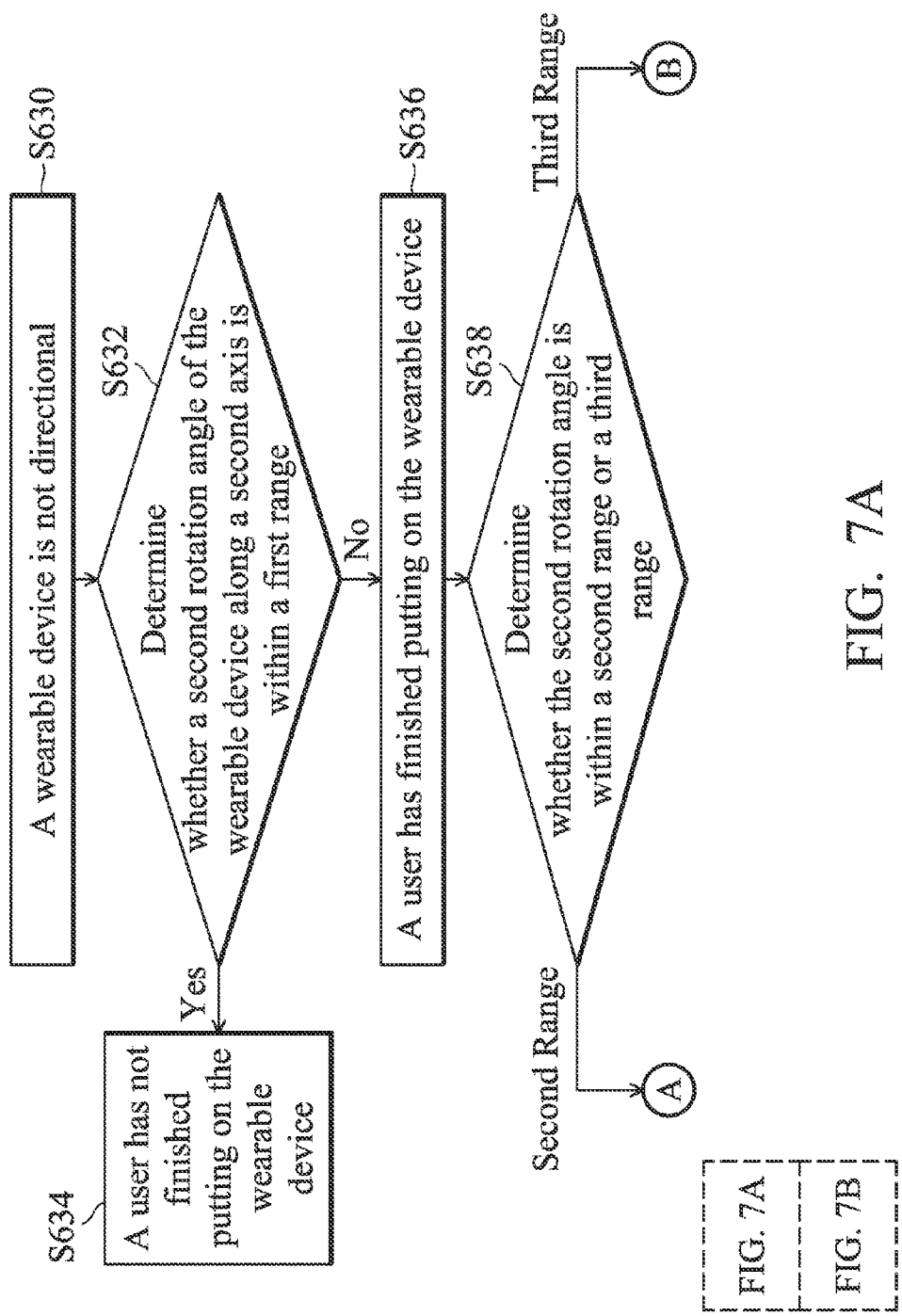
FIG. 7A and FIG. 7B are a flowchart for illustrating a control method for controlling a wearable device without directionality according to an embodiment of the invention.
Figure 7B:
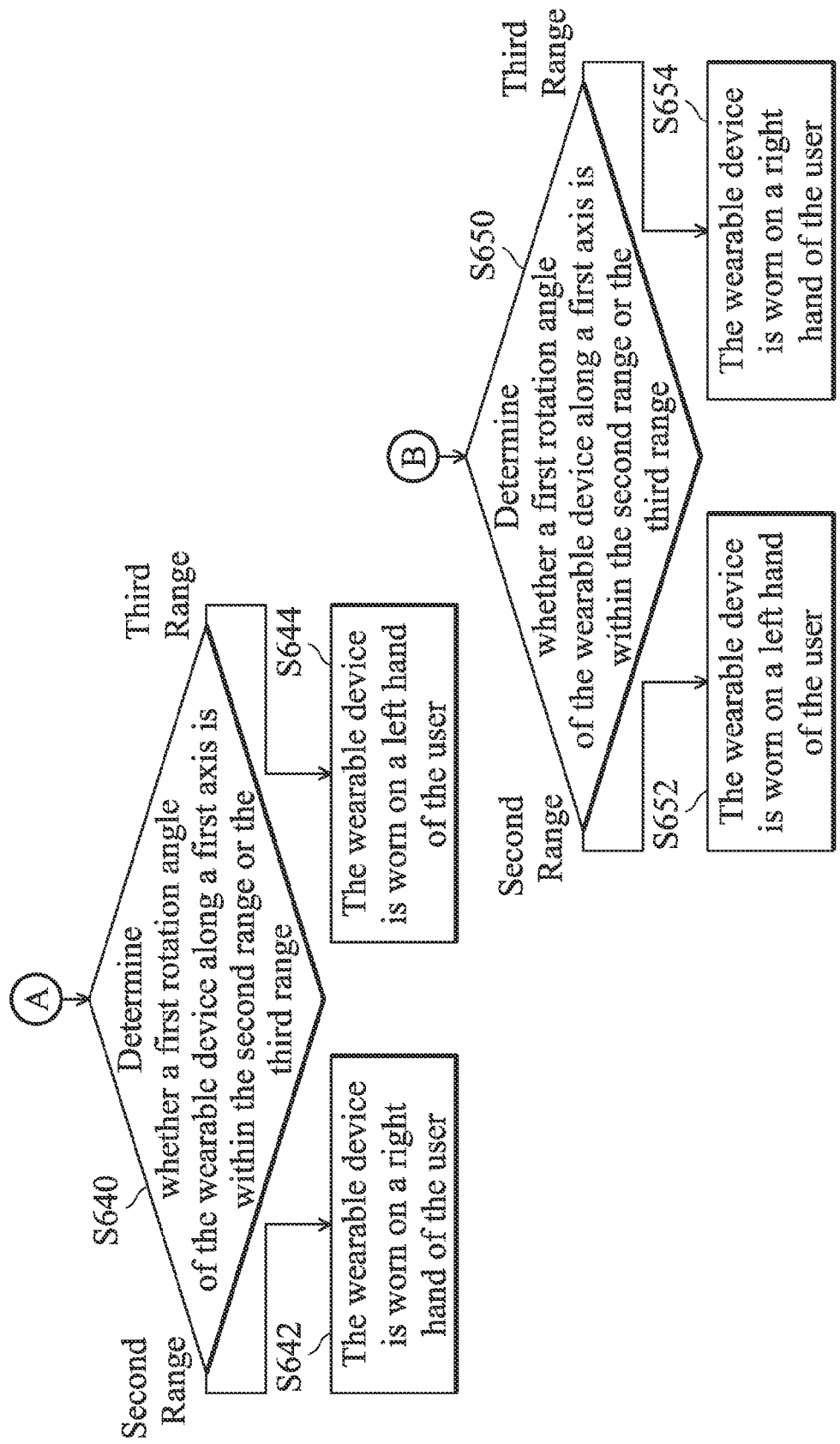

FIG. 7A and FIG. 7B are a flowchart for illustrating a control method for controlling a wearable device without directionality according to an embodiment of the invention. FIG. 7A and FIG. 7B are used to describe detailed operations of steps S250 and S270 of FIG. 2. Following the descriptions of FIG. 2, the movement data is analyzed in step S240. In the embodiment of FIG. 7A and FIG. 7B, the analyzed movement data includes a first rotation angle of the wearable device along a first axis, and a second rotation angle of the wearable device along a second axis. The second axis is perpendicular to the first axis. Please refer to FIG. 7A and FIG. 7B. In step S630, it is determined that the wearable device is not directional. In step S632, whether the second rotation angle is within a first range is determined. If the second rotation angle is within the first range, in step S634, it can be determined that the user has not finished putting on the wearable device (the procedure may go to step S260 of FIG. 2). If the second rotation angle is not within the first range, in step S636, it can be determined that the user has finished putting on the wearable device. Next, in step S638, whether the second rotation angle is within a second range or a third range is determined. If the second rotation angle is within the second range, in step S640, whether the first rotation angle is within the second range or the third range can be further determined. If the first rotation angle is within the second range, in step S642, it can be determined that the wearable device is worn on the right hand of the user (the procedure may go to step S290 of FIG. 2). If the first rotation angle is within the third range, in step S644, it can be determined that the wearable device is worn on the left hand of the user (the procedure may go to step S280 of FIG. 2). Please refer to step S638 again. If the second rotation angle is within the third range, in step S650, whether the first rotation angle is within the second range or the third range can be further determined. If the first rotation angle is within the second range, in step S652, it can be determined that the wearable device is worn on the left hand of the user (the procedure may go to step S280 of FIG. 2). If the first rotation angle is within the third range, in step S654, it can be determined that the wearable device is worn on the right hand of the user (the procedure may go to step S290 of FIG. 2).

TABLE II

Determination of Left and Right for Wearable Device without Directionality

| | $-90° < θ2 < -TH$ | $+TH < θ2 < +90°$ |
|---|---|---|
| $-90° < θ1 < -TH$ | Right Hand | Left Hand |
| $+TH < θ1 < +90°$ | Left Hand | Right Hand |

To be brief, in the embodiment of FIG. 7A and FIG. 7B, the determination conditions of the wearable device without directionality may be illustrated in Table II, in which "θ1" represents a first rotation angle, "θ2" represents a second rotation angle, "−TH" represents a first threshold value, and "+TH" represents a second threshold value. The aforementioned axes, threshold values, rotation angles, and angle ranges may be described in the embodiments of FIG. 3, FIG. 4A, FIG. 4B, and FIG. 5. The determination conditions of Table II are set according to the habits of human beings putting on wearable devices. A wearable device without directionality may require at least two rotation angles to complete the determination procedure.

The invention provides a novel control method for controlling a wearable device. In the invention, the wearable device can automatically determine whether a user puts on it on the left hand or the right hand according to detection signals from a sensor therein. In such a manner, the user easily uses the wearable device accurately without caring about the putting-on direction, and it therefore significantly improves the convenience of use and the accuracy of processing data. Furthermore, the automatic determination procedure of the above control method further includes checking a start condition. This checking step can reduce the amount of calculation required by the processor of the wearable device and decrease the probability of data misjudgment. In comparison to the prior art, the invention has at least the advantages of both improving user experience and maintaining low complexity of the whole system, and it is therefore suitably applied to a variety of wearable devices.

It is understood that the control method and the wearable device of the invention are not limited to the configurations of FIGS. 1-7B. The invention may merely include any one or more features of any one or more embodiments of FIGS. 1-7B. In other words, not all of the features shown in the figures should be implemented in the control method and the wearable device of the invention. Furthermore, the order of performing steps is not a limitation of the invention. A designer can change the order of performing steps according to different requirements, or can omit one or more steps of the flowchart. For example, according to Table II, the range of the second rotation angle may be determined after the range of the first rotation angle is determined (following step S638 of the procedure), and then whether the user puts on the wearable device on the left hand or the right hand is determined. In addition, the control method and the wearable device of the invention are not limited to the determination that the wearable device is worn on the left hand or the right hand of the user. In other embodiments, adjustments are made such that the control method is used to determine whether the wearable device is worn on the left side or the right side of the user. For example, the left side of the user includes the left ear, the left foot, and the left side of waist of the user, and the right side of the user includes the right ear, the right foot, and the right side of waist of the user.

The method of the invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A control method, comprising the steps of:
providing a wearable device which comprises a sensor;
detecting and recording movement data relative to the wearable device via the sensor;
determining whether the wearable device has triggered a start condition;
if the start condition has been triggered, analyzing the movement data;
determining whether a user has finished putting on the wearable device according to the analyzed movement data; and
if the user has finished putting on the wearable device, determining whether the wearable device is worn on a left side or a right side of the user according to the analyzed movement data;
wherein the sensor is a gravity sensor or a gyro;
wherein the analyzed movement data comprises a first rotation angle of the wearable device along a first axis;
wherein the wearable device is directional, and the control method further comprises:
if the first rotation angle is within a first range, determining that the user has not finished putting on the wearable device; and
if the first rotation angle is not within the first range, determining that the user has finished putting on the wearable device.

2. The control method as claimed in claim 1, wherein the wearable device further comprises a control switch, and the control method further comprises:
if the user has touched the control switch, determining that the start condition has been triggered.

3. The control method as claimed in claim 1, further comprising:
if the user has not finished putting on the wearable device, redetecting and updating the movement data via the sensor.

4. The control method as claimed in claim 1, further comprising:
if the first rotation angle is within a second range, determining that the wearable device is worn on the left side of the user; and
if the first rotation angle is within a third range, determining that the wearable device is worn on the right side of the user;
wherein the first range, the second range, and the third range do not overlap with each other.

5. A control method, comprising the steps of:
providing a wearable device which comprises a sensor;
detecting and recording movement data relative to the wearable device via the sensor;
determining whether the wearable device has triggered a start condition;
if the start condition has been triggered, analyzing the movement data;
determining whether a user has finished putting on the wearable device according to the analyzed movement data; and
if the user has finished putting on the wearable device, determining whether the wearable device is worn on a left side or a right side of the user according to the analyzed movement data;
wherein the sensor is a gravity sensor or a gyro;
wherein the analyzed movement data comprises a first rotation angle of the wearable device along a first axis;
wherein the analyzed movement data further comprises a second rotation angle of the wearable device along a second axis, and the second axis is perpendicular to the first axis;
wherein the wearable device is not directional, and the control method further comprises:
if the second rotation angle is within a first range, determining that the user has not finished putting on the wearable device; and
if the second rotation angle is not within the first range, determining that the user has finished putting on the wearable device.

6. The control method as claimed in claim 5, further comprising:
if the second rotation angle is within a second range and the first rotation angle is within a third range, or if the second rotation angle is within the third range and the first rotation angle is within the second range, determining that the wearable device is worn on the left side of the user; and
if the second rotation angle and the first rotation angle are both within the second range, or if the second rotation angle and the first rotation angle are both within the third range, determining the wearable device is worn on the right side of the user;
wherein the first range, the second range, and the third range do not overlap with each other.

7. The control method as claimed in claim 1, wherein the left side of the user comprises a left ear or a left foot, and the right side of the user comprises a right ear or a right foot.

* * * * *